UNITED STATES PATENT OFFICE.

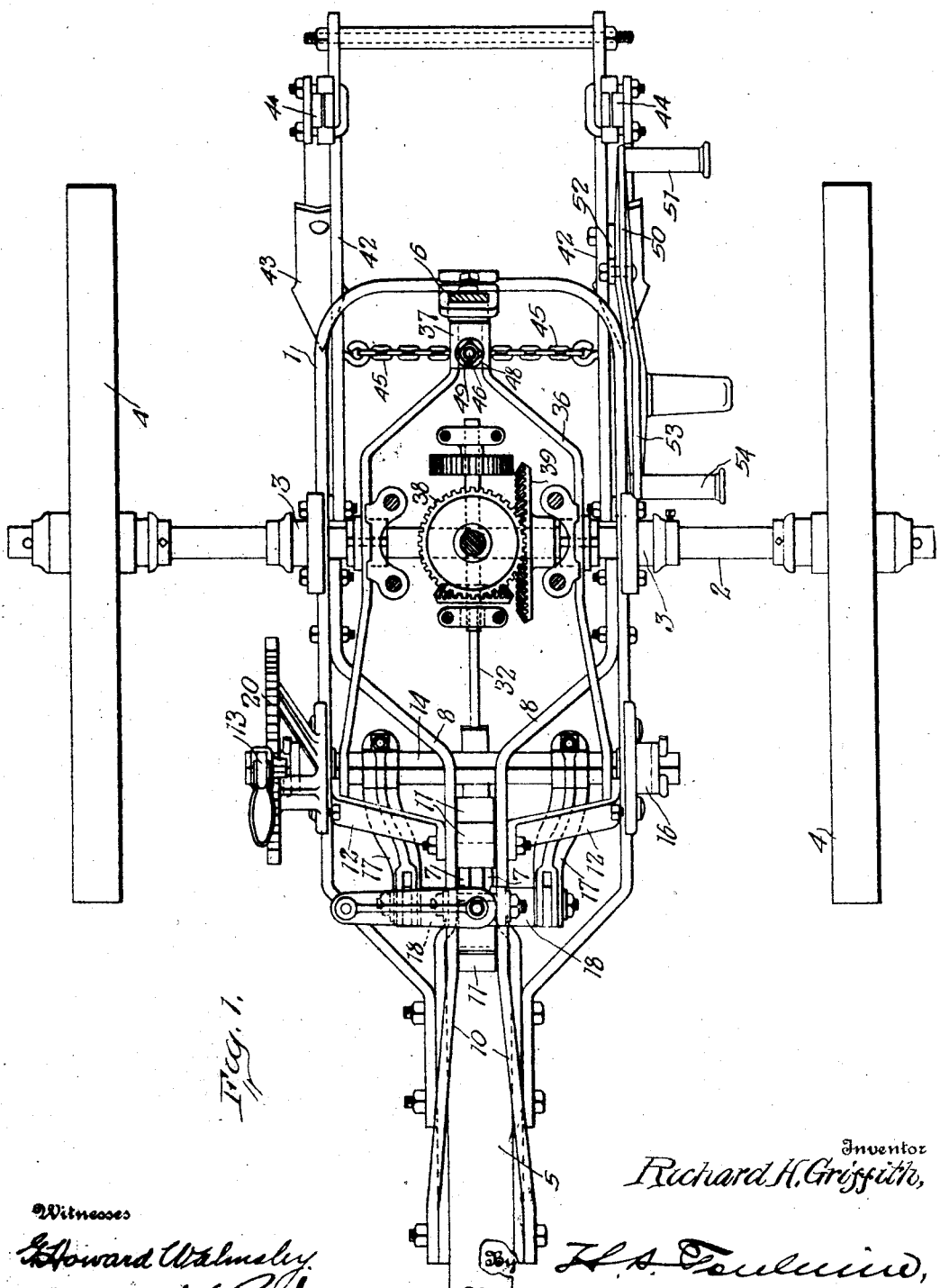

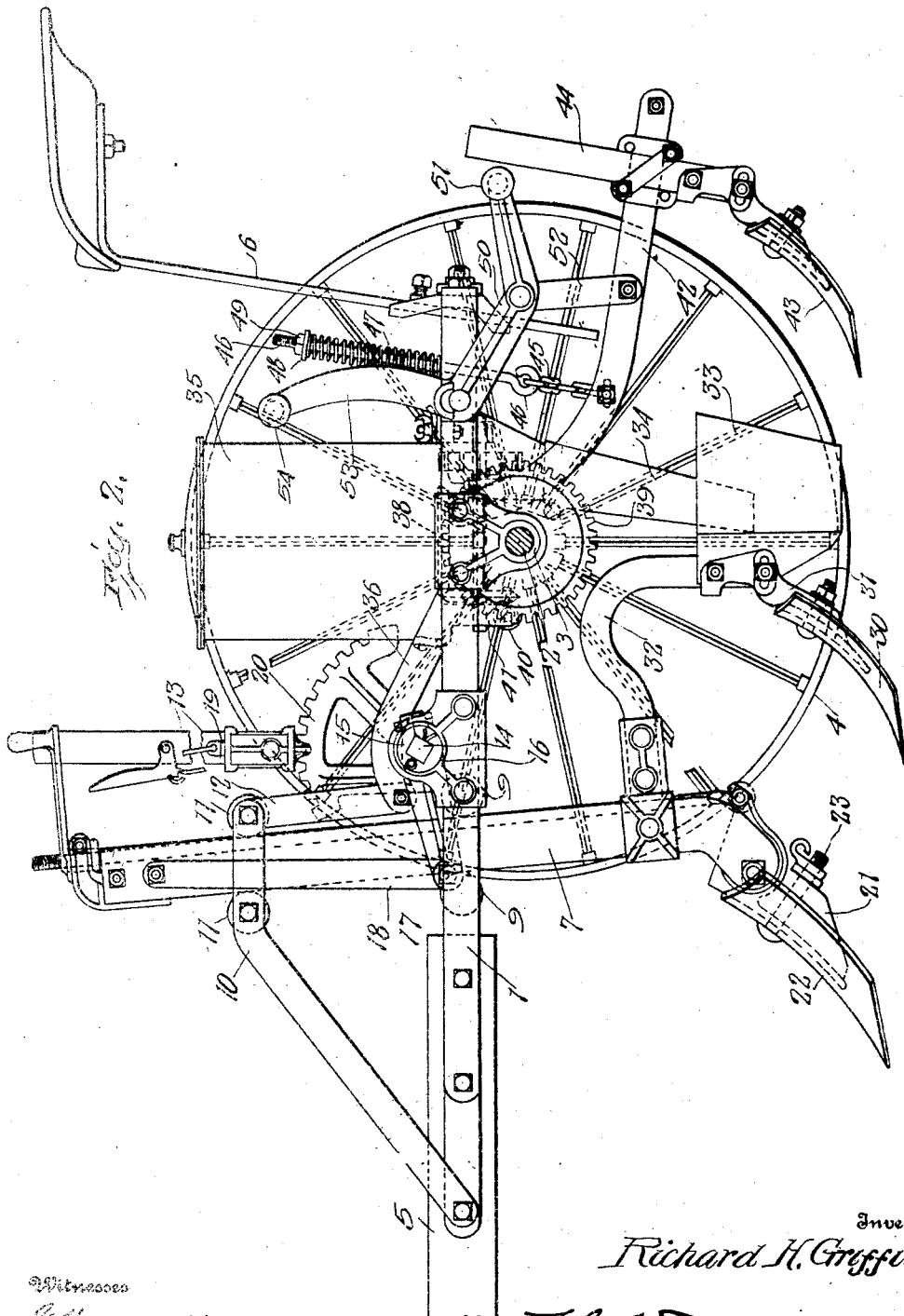

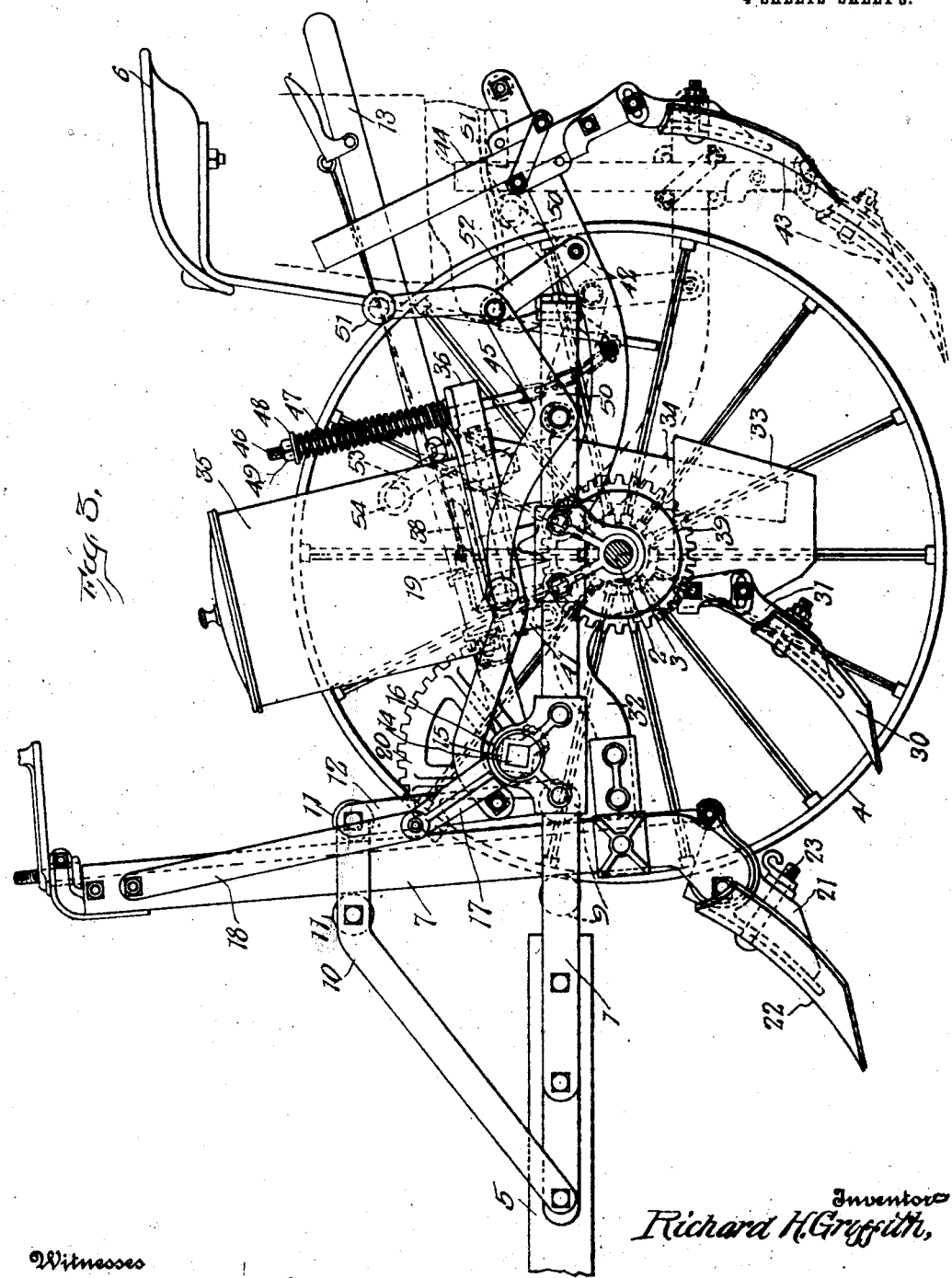

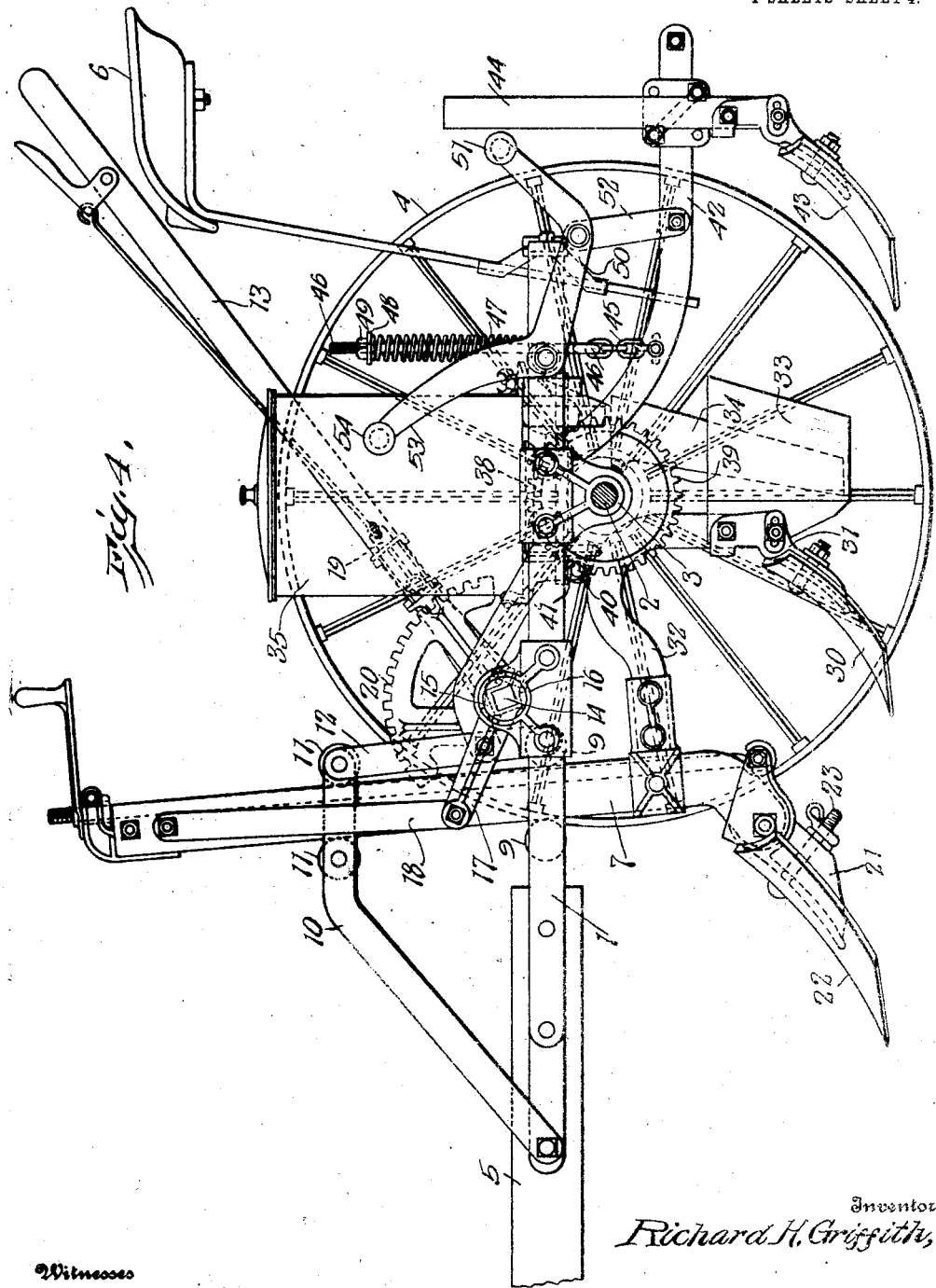

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

PLANTER.

1,032,668.  Specification of Letters Patent.  Patented July 16, 1912.

Application filed October 10, 1910. Serial No. 586,181.

*To all whom it may concern:*

Be it known that I, RICHARD H. GRIFFITH, a citizen of the United States, residing at Bellevue, in the county of Huron and State of Ohio, have invented certain new and useful Improvements in Planters, of which the following is a specification, reference being had therein to the accompanying drawings.

This invention relates to planters, such as are utilized for planting cotton, corn or other seeds.

The object of the invention is to provide a planter in which the several parts coöperating to plant the grain may be successively moved into their inoperative positions, thereby enabling the grain to be deposited in the furrow and to be covered up to the end of the row and yet enabling each part to be moved into an inoperative position as soon as it reaches the end of the row; to provide a single operating member for moving the several parts which coöperate to plant the grain into and out of their operative positions; to provide means independent of this operating member to enable the covering device to be retained in its operative position; and further, to provide a furrow opener having an adjustable support for the furrow opening shovel, whereby it may be adjusted to support the shovel at different angles to the ground line and also to accommodate the support to shovels of different styles.

In the accompanying drawings, Figure 1 is a top plan view of a planter embodying my invention; Fig. 2 is a side elevation with one of the ground wheels broken away, showing the several planting devices in their operative positions; Fig. 3 is a similar view, showing the planting devices in their inoperative positions; and Fig. 4 is a similar view showing the furrow opener and subsoiler in their inoperative positions and the feeding mechanism and covering shovels in their operative positions.

In these drawings I have illustrated one embodiment of my invention and have shown the same as comprising a main frame 1 having an axle 2 journaled in bearings 3 carried by said main frame. Ground wheels 4 are mounted on said axle and are preferably rigidly secured thereto. Connected to the forward portion of the main frame is a pole or tongue 5 and a seat 6 is mounted on the rear portion of said frame. Arranged near the forward end of the main frame is a vertically adjustable furrow opener, which, as here shown, comprises a substantially vertical shank 7 which preferably comprises two members rigidly connected one to the other and arranged between two longitudinal guide bars 8 rigidly secured at their opposite ends to and forming a part of the main frame. These bars have rollers 9 mounted between them and spaced apart a distance sufficient to receive the shank 7, thus constituting a guide which effectually prevents any movement of the shank other than a vertical movement. The shank is also further guided at a point above the main frame, this being accomplished, in the present instance, by two guide bars 10 spaced apart to receive the shank and having rollers 11 to engage the front and rear edges thereof after the manner of the rollers 9. The forward ends of the guide bars 10 extend downwardly and forwardly and are rigidly secured to the main frame. The rear portions of these bars are connected to the main frame by means of brace bars 12 extending downwardly and laterally thereform. Vertical movement may be imparted to the shank 7 in any suitable manner, but this is preferably accomplished by means of an operating member, such as a lever 13 which is rigidly secured to one end of a shaft 14. This shaft is here shown as a square shaft and is mounted in bushings 15 which are journaled in bearings 16 carried by the main frame. Rigidly secured to the shaft 14 and extending forwardly therefrom are two arms 17 arranged one on each side of the shank 7 and connected thereto by means of links 18. Consequently, the movement of the lever 13 and the rotation of the shaft 14 will raise or lower the shaft, according to the direction of movement of the lever. The lever is preferably provided with the usual spring-pressed dog 19 adapted to coöperate with a toothed segment 20 to retain the handle in adjusted position. The furrow opening shovel may be secured to the lower end of the shank in any approved manner, and, as here shown, the shank is provided with a supporting member 21 on which the shovel 22 is secured by means of a bolt 23.

Arranged in the rear of the furrow opener and operatively connected with the lever 13 is a sub-soiler. This preferably comprises a shovel 30, somewhat smaller in size than the furrow opener shovel, mounted on a support 31 carried by an arm 32 which extends upwardly and thence forwardly and is rigidly secured at its forward end to the shank 7 of the furrow opener. Rigidly secured to the upwardly extending portion of the arm 32 is a shield 33 which surrounds the lower end of the grain spout 34. In this manner the furrow opener, sub-soiler and shield are caused to move in unison by the operation of the lever 13. A grain receptacle or hopper 35 is supported on the main frame, preferably by mounting the same upon an auxiliary frame 36 comprising two side members which are pivotally connected at their forward ends to the main frame. In the present instance the two side members of the supplemental frame extend above the shaft 14 and are connected to the main frame by securing the same to the rigid brace bars 12. The rear ends of the side members of this frame converge rearwardly and are rigidly connected one to the other and spaced a short distance apart, as shown at 37. A suitable grain feeding device is mounted in the lower part of the grain receptacle 35 and comprises a part of that receptacle. This grain feeding device may be of any suitable character, and as it comprises no part of the present invention, it need not be here described further than to state that it includes a bevel gear 38 which meshes with a bevel gear 39 rigidly secured to the axle 2, thereby causing the grain feeding device to be actuated by the movement of the ground wheels. The grain spout 34 communicates with the bottom of the receptacle 35 and is arranged to receive the grain from the receptacle and to discharge the same into the furrow in the rear of the sub-soiler 31. By moving the grain receptacle vertically about the pivotal axis of its supporting frame, the gears 38 and 39 will be moved out of mesh one with the other and the operation of the grain feeding device will be interrupted. This movement of the grain receptacle may be accomplished in any suitable manner, but is preferably controlled by the movement of the lever 13. As here shown, this connection comprises a part carried by the shank 7 and adapted to engage a part connected with the frame 36, thereby causing the frame 36 to be actuated by the upward movement of the shank 7. These parts are shown in the drawings as comprising a projection or roller 40 connected to the auxiliary frame 36, preferably by means of a bracket 41 secured to the grain receptacle 35. This roller is arranged in the path of the arm 32 of the sub-soiler and in such a position that when the parts are in their normal or operative positions, the roller will be some distance from the arm. Consequently, the first portion of the movement of the lever 13 and the furrow opener will not affect the driving connections for the grain feeding device and the lever may be placed in an intermediate position without affecting this connection. This continued movement of the lever will, however, cause the shank and the arm 32 to be moved to a still greater height and this further movement will cause the arm 32 to engage the projection 40 and move the auxiliary frame 36 about its pivotal center, thus separating the gears 38 and 39 and interrupting the operation of the feeding device.

A suitable covering device is so arranged in the rear of the shield 33 of the grain spout that when the grain receptacle is in its normal position and the grain feeding device is operatively connected with the ground wheels it will cover the grain which has been deposited in the furrow. When the operation of the grain feeding device has been interrupted, the covering device will be automatically moved into an inoperative position. Means are provided, however, to enable the operator to retain the covering device in its operative position after the grain has ceased to feed. In the present construction this covering device comprises a supplemental or supporting frame 42, pivotally connected at its forward end to the main frame, extending downwardly and rearwardly and having mounted thereon near its rear end suitable covering shovels 43 which are supported by shanks 44 adjustably clamped to the side members of the supplemental frame 42. These shovels are arranged one on each side of the furrow and in such positions as to throw the dirt into the furrow. The supplemental frame 42 is so connected with the auxiliary frame 36, which carries the grain feeding mechanism, that the movement of this mechanism into an inoperative position will move the supplemental frame about its pivotal center and lift the covering shovels out of engagement with the ground. This connection, as here shown, comprises two short chains 45 connected at their lower ends to the respective side members of the supplemental frame 42 and connected at their upper ends to the lower end of a rod 46 which extends upwardly through the space between the rear ends of the side members of the supplemental frame 36. A spring 47 is coiled about the rod 46 and is confined between the supplemental frame 36 and a washer 48 which is adjustably retained on the upper end of the rod 46 by means of a nut 49. The tension of the spring 47 is such as to lift the weight of the supplemental frame 42 and the parts carried thereby, thus causing the same to follow the movement of the auxiliary frame 36 when no resistance is offered to the movement of these parts. Should the driver desire to retain the covering shovels in their operative positions after the grain feeding device has been moved into its inoperative position, to cover the grain in that portion of the furrow between the grain spout and the covering devices, he can do so by resisting the upward movement of the supplemental frame 42 or he can move this frame down after it has been elevated. The means herein provided for accomplishing this comprises a lever 50 pivotally connected to the main frame at its forward end and having a foot piece 51 at its rear end. A link 52 connects the lever with the supplemental frame 42. The lever is also preferably provided with an upwardly extending arm 53 having a foot piece 54 by means of which the driver can actuate the lever to lift the covering shovels out of engagement with the ground while the other parts are in their operative positions should this, for any reason, be desirable. It will be apparent therefore that one complete movement of the lever 13 will cause all of the parts which coöperate to plant the grain to be moved into their inoperative positions. The furrow opener which first reaches the end of the row will first be lifted out of engagement with the ground, thus permitting it to pass beyond the end of the row without interfering with the seed feeding device, but permitting the same to operate until the grain spout 34 has reached the end of the row, when the operation of the feeding device will be interrupted. The interruption of the feeding device will also move the covering devices into inoperative position unless this movement is positively resisted by the driver, but he may, if he desires, retain these shovels in engagement with the ground until they have reached the end of the row, thus covering all the grain which has been deposited in the furrow.

While I have shown and described one embodiment of the invention it will be readily apparent that the several results can be accomplished in other ways and the detail construction of the machine widely varied without departing from my invention, and I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In a machine of the character described, the combination, with a frame, ground wheels therefor, a furrow opener movable into and out of operative relation to the ground, a grain receptacle movably mounted on said frame and having a grain feeding device, an operative connection between said grain feeding device and said ground wheels, and a covering device movably supported on said frame, of means for moving said furrow opener out of operative relation to the ground and interrupting the connection between said grain feeding device and said ground wheels, and means actuated by the movement of said grain receptacle for moving said covering device into an inoperative position, said operations taking place successively and in the order named.

2. In a machine of the character described, the combination, with a main frame, ground wheels therefor, a furrow opener movably mounted on said main frame, an auxiliary frame movably mounted on said main frame, a grain receptacle carried by said auxiliary frame, and a covering device carried by said main frame, of a lever mounted on said main frame and operatively connected with said furrow opener, means actuated by the movement of said lever for controlling the movement of said auxiliary frame, means controlled by the movement of said auxiliary frame for moving said covering device into an inoperative position, after some movement has been imparted to said auxiliary frame, and means for moving said covering device into and out of operative position independently of the movement of said auxiliary frame.

3. In a machine of the character described, the combination, with a main frame, ground wheels therefor, a furrow opener movably mounted on said main frame, an auxiliary frame movably mounted on said main frame, a grain receptacle carried by said auxiliary frame, and a covering device carried by said main frame, of a lever mounted on said main frame and operatively connected with said furrow opener, means actuated by the movement of said lever for controlling the movement of said auxiliary frame, and means controlled by the movement of said auxiliary frame for moving said covering device into an inoperative position, said covering device being capable of being held in an operative position after said auxiliary frame has been moved by the operation of said lever.

4. In a machine of the character described, the combination, with a main frame, ground wheels therefor, a furrow opener movably mounted on said main frame, a grain receptacle movably mounted on said main frame, and a covering device movably mounted on said main frame and operatively connected with said grain receptacle, whereby the movement of said grain receptacle into its inoperative position will cause said covering device to be moved into its inoperative position, of an operating member connected with said furrow opener and said grain receptacle, and means whereby said covering device may be retained in its operative position when said grain receptacle has been moved into its inoperative position.

5. In a machine of the character described, the combination, with a main frame, ground wheels therefor, an auxiliary frame movably mounted on said main frame, a grain receptacle carried by said auxiliary frame, a covering device movably mounted on said main frame, and a resilient connection between said covering device and said auxiliary frame, of means for actuating said auxiliary frame to move said grain receptacle and said covering device into inoperative positions.

6. In a machine of the character described, the combination, with a main frame, ground wheels therefor, an auxiliary frame pivotally mounted on said main frame, a grain receptacle carried by said auxiliary frame, a supporting frame pivotally mounted on said main frame, covering shovels carried by said supporting frame, and resilient connection between said auxiliary frame and said supporting frame, of means for moving said auxiliary frame about its pivotal center to move said grain receptacle into an inoperative position, and a foot piece connected with said supporting frame and adapted to be engaged by the driver to prevent the movement of said supporting frame when said auxiliary frame is moved.

7. In a machine of the character described, the combination, with a main frame, ground wheels therefor, a furrow opener movably mounted on said main frame, a sub-soiler comprising an arm rigidly connected with said furrow opener, an auxiliary frame pivotally mounted on said main frame and having a projection arranged in the path of the arm of said sub-soiler, a grain receptacle carried by said auxiliary frame, a supporting frame pivotally mounted on said main frame, covering shovels carried by said supporting frame, and a spring-controlled connection between said auxiliary frame and said supporting frame, of a lever operatively connected with said furrow opener, whereby the movement of said lever will move said furrow opener, said sub-soiler, said grain receptacle and said covering shovels, into inoperative positions, and a foot lever connected with the supporting frame for said covering shovels, whereby said shovels may be moved into their operative positions against the tension of said spring connection.

In testimony whereof, I affix my signature in presence of two witnesses.

RICHARD H. GRIFFITH.

Witnesses:
 E. H. ERDRICH,
 G. A. SURER.